May 19, 1925.
C. S. FAIR
1,538,102
GASOLINE DISPENSING DEVICE
Filed Oct. 23, 1922 — 2 Sheets-Sheet 1
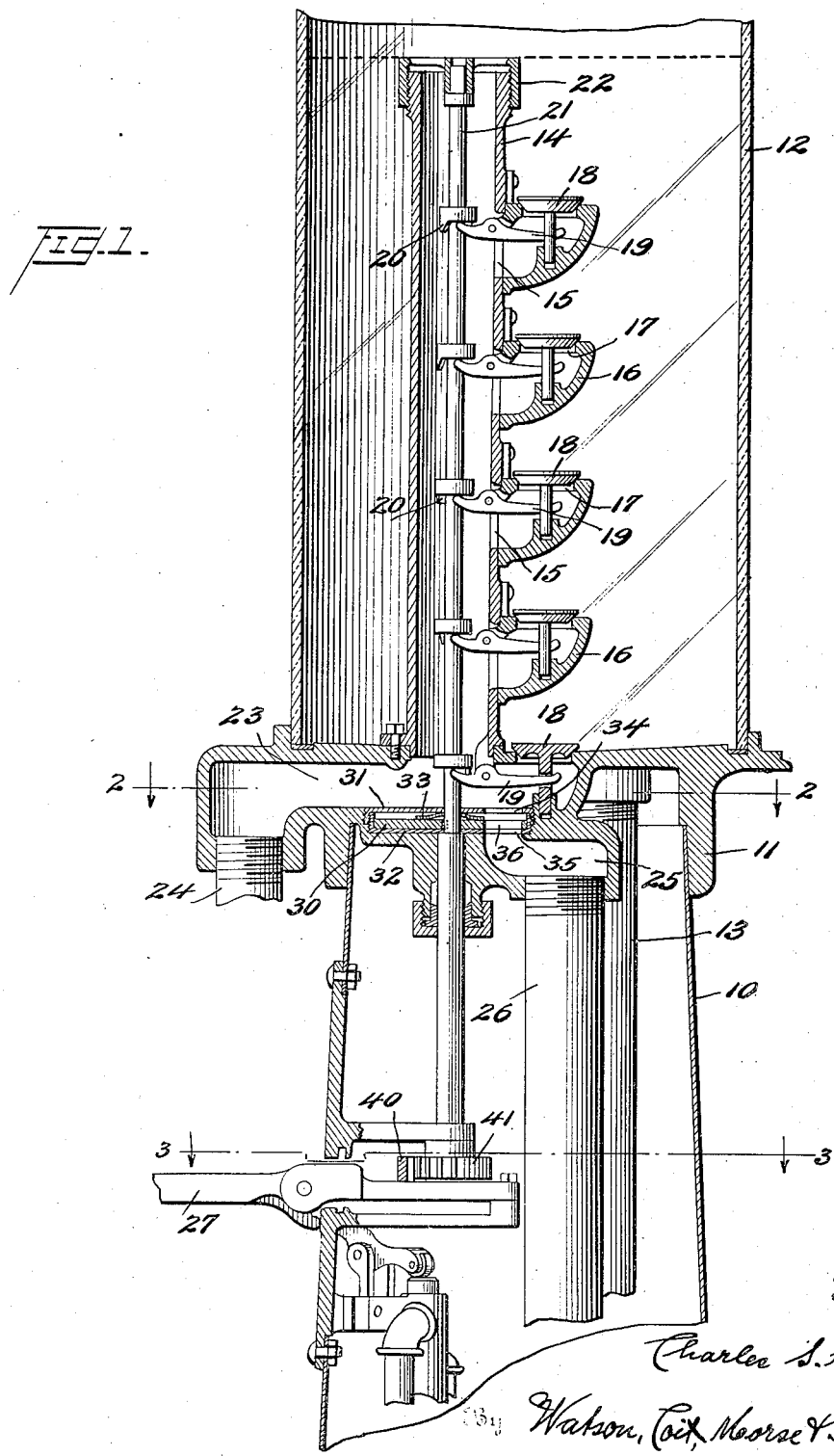

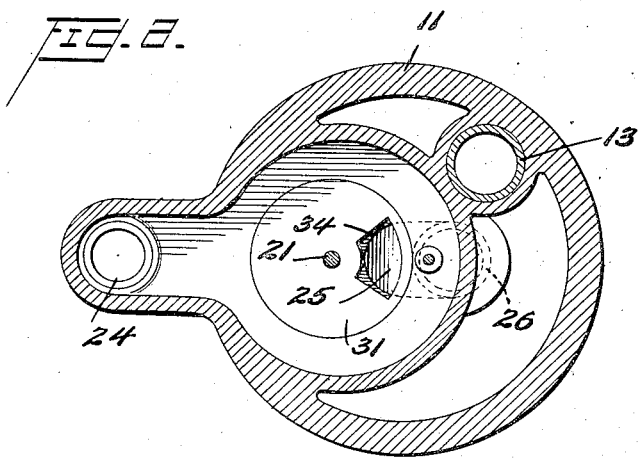
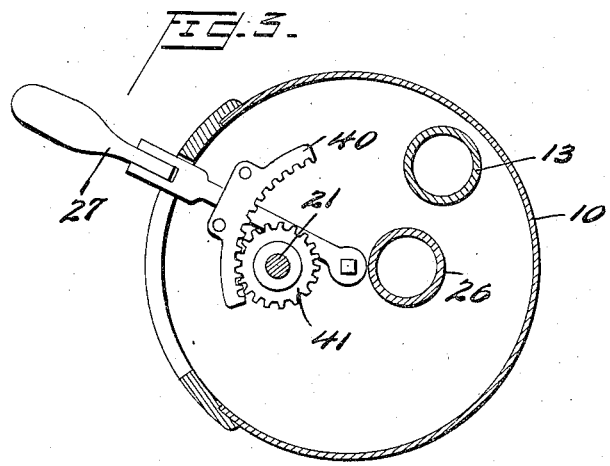
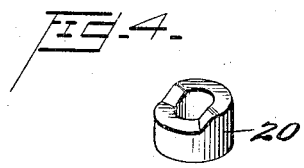

Patented May 19, 1925.

1,538,102

UNITED STATES PATENT OFFICE.

CHARLES S. FAIR, OF FORT WAYNE, INDIANA.

GASOLINE-DISPENSING DEVICE.

Application filed October 23, 1922. Serial No. 596,471.

*To all whom it may concern:*

Be it known that I, CHARLES S. FAIR, a citizen of the United States, and residing at Fort Wayne, Allen County, State of Indiana, have invented certain new and useful Improvements in Gasoline-Dispensing Devices, of which the following is a specification.

The present invention relates to liquid dispensing apparatus and particularly to dispensing apparatus of the elevated container type, in which the gasoline or other liquid is pumped from a main storage tank which is usually under ground, into an elevated container from which it is allowed to flow by gravity into a receptacle presented by a purchaser, the elevated container being preferably formed of glass so that the liquid may be observed by the purchaser.

The object of the invention is to provide a novel and improved measuring valve construction by means of which the operator may dispense at one time the entire contents of the elevated container or may dispense a desired fraction thereof, in case the purchaser desires a smaller amount. The apparatus is simple, easily fabricated, measures out fuel in an accurate manner, and is leak proof, thus being a considerable improvement over prior devices of this kind heretofore designed or suggested.

In the accompanying drawings one form of the invention, which may have different embodiments, is illustrated and in the following paragraphs the construction and mode of operation thereof will be explained in detail.

In the drawings:

Figure 1 is a vertical longitudinal section through the upper portion of a dispensing device of the elevated container type showing the invention incorporated therewith;

Figure 2 is a section on line 2—2 of Figure 1;

Figure 3 is a section on line 3—3 of Figure 1; and

Figure 4 is a perspective view of a detail.

The pedestal 10 has its lower end mounted upon the ground or a suitable base and supports at its upper end the head 11 upon which is mounted the container 12. The container 12 is preferably a glass cylinder so that the purchaser may observe its contents. A supply pipe 13 leads from a storage tank at a lower level, preferably underground, to the container 12, the pipe passing through a suitable aperture in the head 11. A cylindrical tube 14 stands vertically within the container and at its lower end makes a fluid-tight fit with the inner wall of an aperture in the head 11. This tube is provided with a plurality of inlet apertures 15 each of which opens into an elbow 16, secured to the tube and having a horizontally disposed aperture 17 controlled by a poppet valve 18. Each poppet valve has an aperture in the stem through which one arm of a pivoted lever or rocker 19 projects, the other arm of the rocker lying in the path of a cam 20 secured to a rotatable rod 21. The upper end of the tube 14 has an adjustable ring 22 screw threaded thereon so that the level of the upper end of the tube may be adjusted as desired.

The tube communicates at its lower end with a passage 23 in the pedestal head 11 which passage leads to a dispensing tube 24 and also to drain port 25 communicating with a drain pipe 26 by means of which the overflow is drained back into the storage tank. The rod 21 extends through the bottom of the pedestal head 11 and its lower end is connected through suitable gearing with an operating handle 27 by means of which the rod may be rotated to a desired angular position.

Secured on this rod so as to be rotatable therewith is a valve disk 30 enclosed in a casing formed in two parts 31 and 32 having threaded engagement with each other, the upper member 31 also having threaded engagement with the pedestal head 11. Interposed between the valve disk 30 and the upper casing member 31 is a leaf spring 33 by means of which the valve disk is tightly pressed at all times against the lower casing member 32. The upper and lower casing members are provided with aligned apertures 34 and 35 respectively, of segmental shape as shown in Figure 2, and the intermediate valve disk 30 is provided with an aperture 36 of corresponding shape, the arrangement being such that by rotation of the valve disk 30 the three apertures 34, 35 and 36 may be brought into alignment so that liquid may pass into the drain pipe or, by further rotating disk 30 so that the aperture 36 is not in register with the apertures 34 and 35 the passage of fluid may be blocked.

The disk 30 is so arranged with relation to the cam members 20 that when any one of the valves 18 is lifted from its seat, valve 30 will be in its closed position so that liquid flowing down through tube 14 must necessarily flow into the dispensing tube 24. On the other hand, when handle 27 has been turned to close all of valves 18, the drainage valve will be opened so that leakage overflowing into tube 14 at its top will pass directly back to the storage tank.

The valve seats for the valves 18 are horizontally disposed and are preferably at such elevations (in a gasoline dispensing apparatus) that when the liquid level falls from one such valve seat to the next lower valve seat the content of the container is reduced one gallon. The cam members 20 are so arranged that when the handle is rotated the uppermost valve will first be opened. Further rotation of the lever will effect the opening of the second valve from the top as well as the first, and still further rotation of the handle may effect the opening of the three lowermost valves successively. By properly positioning the handle, therefore, the desired amount of liquid may be withdrawn and dispensed.

The connection between the operating handle 27 and the rotatable rod 21 may be made in various ways but it will be seen from Figure 3 of the drawings that in the present instance I have placed a circular rack 40 on the handle which rack meshes with a pinion 41 on rod 21 so that swinging movement of the handle through a limited distance will effect the desired rotation of the rod.

The pressure of the fluid within the container when filled tends to maintain the valves closed tightly on their seats and to thereby prevent leakage and the spring 33 pressing tightly against the disk valve 30 maintains it in fluid-tight contact with the lower casing member 32 so that no leakage may occur to the storage tank.

The design and arrangement of the component elements of the invention may be, if desired, modified to suit conditions. The apparatus is adapted for all kinds of fluids but particularly for gasoline.

Having thus described the invention what is claimed as new and desired to be secured by Letters Patent is:

1. In a liquid dispensing apparatus, in combination, a container, a dispensing pipe, a vertical conduit within said container having its lower end in communication with said dispensing pipe, a series of vertically opening poppet valves supported by and controlling openings in said conduit, and single means for successively opening said valves.

2. In a liquid dispensing apparatus, in combination, a container, a chamber below said container, a dispensing pipe and a drain pipe connected to said chamber, a vertical conduit in said container opening into said chamber, a series of poppet valves controlling ports in said conduit, a valve controlling said drain pipe, and single means for closing said drain pipe valve and opening said poppet valves successively.

3. In a liquid dispensing apparatus, in combination, a container, a supply pipe for said container, a dispensing pipe, a series of co-axial poppet valves controlling openings in the container disposed at different levels, said valves having their upper faces horizontal whereby the fluid in the container tends to hold them closed, each opening communicating with said dispensing pipe, and means to control said valve one at a time.

4. In a liquid dispensing apparatus, in combination, a container, a chamber adjacent the lower end of said container, said chamber having a dispensing opening and a valved drain opening, a conduit within the container having its lower end in communication with said chamber and its upper end open and also having a series of valved inlet ports disposed at different levels, and connected means to control said port valves and drain opening valves, said opening being closed when one of the ports is open, and open when all the ports are closed.

5. In a liquid dispensing apparatus, in combination, a container, a drain pipe, a conduit within the container having communication with said pipe, a discharge pipe in communication with said conduit, said conduit having a series of inlet ports opening into the container at different levels, a valve for each port, and single means to control said valves one at a time.

6. In a liquid dispensing apparatus, in combination, a container, a drain pipe, a conduit within the container having communication with the drain pipe and having a series of inlet ports disposed at different levels, a valve for each port, and means to control said valves, one at a time, including a vertical rod rotatively mounted in said conduit.

7. In a liquid dispensing apparatus, in combination, a container, a drain pipe, a conduit within the container having communication with the drain pipe and having a series of inlet ports disposed at different levels, a valve for each port, means to control said valves, one at a time, including a vertical rod rotatively mounted in said conduit and carrying cams, one for each valve.

In testimony whereof I hereunto affix my signature.

CHARLES S. FAIR.